US008850420B2

(12) United States Patent
Yousouf et al.

(10) Patent No.: US 8,850,420 B2
(45) Date of Patent: Sep. 30, 2014

(54) DYNAMICALLY UPDATING ON-DEMAND RUNTIME PLATFORMS EXECUTING BUSINESS APPLICATIONS

(75) Inventors: Shenol Yousouf, Sofia (BG); Georgi Stanev, Sofia (BG); Katya Todorova, Sofia (BG)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/427,860

(22) Filed: Mar. 22, 2012

(65) Prior Publication Data

US 2013/0254755 A1     Sep. 26, 2013

(51) Int. Cl.
*G06F 9/44* (2006.01)
*G06F 9/445* (2006.01)
*G06F 15/177* (2006.01)
*G06F 15/16* (2006.01)

(52) U.S. Cl.
USPC ............ 717/168; 717/174; 709/221; 709/219

(58) Field of Classification Search
CPC ............... G06F 8/61; G06F 8/65; G06F 8/67; G06F 8/71
See application file for complete search history.

(56) References Cited

U.S. PATENT DOCUMENTS

| | | | | |
|---|---|---|---|---|
| 8,326,889 B2* | 12/2012 | Kaisermayr | ................... | 707/803 |
| 8,346,895 B2* | 1/2013 | Cherdron et al. | ............. | 709/219 |
| 8,446,895 B2* | 5/2013 | Iwamura et al. | ............... | 370/350 |
| 2011/0145787 A1* | 6/2011 | Brunswig et al. | ............. | 717/120 |
| 2012/0084414 A1* | 4/2012 | Brock et al. | ................... | 709/221 |
| 2012/0150796 A1* | 6/2012 | Martick | ........................ | 707/610 |
| 2013/0117749 A1* | 5/2013 | Mechelke et al. | ............ | 718/102 |

* cited by examiner

*Primary Examiner* — Don Wong
*Assistant Examiner* — Mohammad Kabir

(57) ABSTRACT

In one aspect, a business application is provided by a customer for execution in a cloud environment. A runtime platform for the business application is identified based on the functionality of the business application. In another aspect, an installable package for a product composing the business application and a first version of the runtime platform is generated. In yet another aspect, the business application and a second version of the runtime platform are synchronously installed in a cloud environment based on the installable package of the product, where the metadata of the business application and the metadata of the business application are dynamically validated prior the installation to guarantee compatibility.

20 Claims, 6 Drawing Sheets

DYNAMICALLY UPDATING ON-DEMAND RUNTIME PLATFORMS EXECUTING BUSINESS APPLICATIONS

BACKGROUND

Cloud computing is a generally adopted concept addressing a business model of providing computing resources to customers as utility over network. There are a lot of benefits for both the customers and the providers associated with cloud computing. For example, the customers can run various business applications on one or more different platforms without the need to acquire and manage the necessary hardware and software system resources. Furthermore, the amount of consumed resources may change dynamically to match current requirements or demands. In turn, the providers of cloud infrastructure and services have the freedom to focus on developing their system platform offerings instead of marketing business services to end clients.

Cloud computing is characterized by a number of factors, some of which effect the total cost of operations for both, the providers and the customers of on-demand computing resources. For example, it is often a cumbersome task to select the proper runtime components needed by a customer application to operate efficiently on the cloud. Usually, a set of required runtime components to run a business application of the cloud, besides the business applications itself, could be rather big, including, but not limited to core elements of a runtime environment (e.g. application server), enterprise services providing additional system functionality to the deployed applications, internal configuration information, etc. Once selected, the necessary runtime components have to be provisioned to the cloud system environment. Depending on the complexity of the solution, this provisioning or installation process may involve a series of tedious and prone to errors administrative tasks.

Typically, there is no predictability of whether the provisioning process will be successful or not. For example, a failure of the installation in the last stages, e.g., when the installation of a business application fails, the resources consumed during the installation of the runtime platform necessary for the installation and execution of the application, are wasted. Therefore, the components of an entire solution are changed and updated offline, before installing on a cloud environment, to perform exhaustive tests to guarantee the operability of the solution. The tests should ensure compatibility between customer's application and the provided runtime platform in the cloud environment.

BRIEF DESCRIPTION OF THE DRAWINGS

The claims set forth the scope with particularity. The embodiments are illustrated by way of example and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques for dynamically updating on demand runtime platforms executing business applications are described herein. In the following description, numerous specific details are set forth to provide a thorough understanding of the embodiments. One skilled in the relevant art will recognize, however, that the presented ideas can be practiced without one or more of the specific details, or with other methods, components, materials, etc. In other instances, well-known structures, materials, or operations are not shown or described in detail to avoid obscuring.

Reference throughout this specification to "one embodiment", "this embodiment" and similar phrases, means that a particular feature, structure, or characteristic described in connection with the embodiment is included in at least one embodiment. Thus, the appearances of these phrases in various places throughout this specification are not necessarily all referring to the same embodiment. Furthermore, the particular features, structures, or characteristics may be combined in any suitable manner in one or more embodiments.

Figure 1:
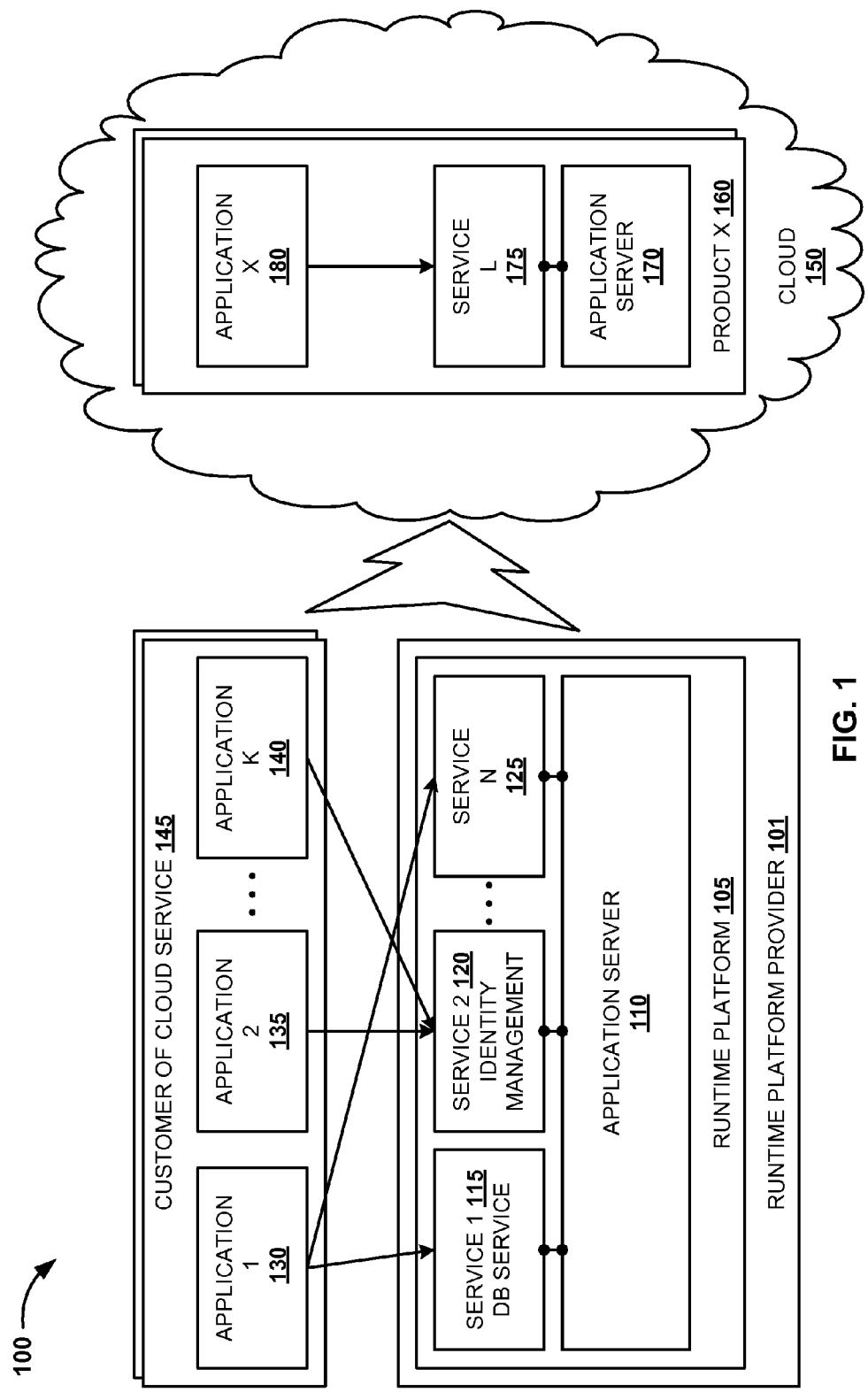
FIG. 1 is a block diagram illustrating a computer system landscape where customer applications are uploaded in cloud environment, according to one embodiment.

FIG. 1 shows an exemplary computer system landscape 100 for uploading customer applications in cloud environment, according to one embodiment. Runtime platform 105 may be developed and maintained by runtime platform provider 101. There are a number of vendors that provide commercial runtime platforms. Just as an example, SAP AG provides SAP® NetWeaver® Neo®, a Java® based Platform-as-a-Service (JPaaS®) offering that makes it possible for partners and customers of SAP AG to deploy and use Java® application in a cloud environment.

In one embodiment, runtime platform 105 includes application server 110 as a core part for building runtime environment based on the runtime platform 105. For example, the application server may be a Java® application server for executing Java® based applications. In another example, the application server 110 may be a webserver to provide environment for execution of web based applications. Further, the runtime platform 105 may include a number of services 115 to 125 which provide additional runtime functionality necessary for the deployed applications. Such services may provide database access interface, e.g., service '1' 115 is illustrated as a database service. For example, the user access to data and/or business functionality could also be controlled by such services, e.g. service '2' 120 is illustrated as identity or profile management server.

A customer of cloud services may create and deliver one or more applications to be executed in cloud environment. The services provided by such applications may be accessed on the cloud by a number of consumers, e.g., related to the customer. As illustrated in FIG. 1, applications 130 to 140 are delivered by one or more customers 145 of the cloud as a service. The different applications 130 to 140 may require different runtime components for their execution. For example application '1' 130 may need to access services '1' 115, '2' 120 and 'N' 125, while applications '2' 135 and 'K'

140 may need to access just service '2' 120. In one embodiment, the applications 130 to 140 provided by one or more of customers 145 needs access to different subsets of the core components of the runtime platform 105. The different subsets may have a common intersection, e.g., application server 110 and a subset of the services 115 to 125 required by all applications 130 to 140.

In one embodiment, a consumer request or another event may invoke the execution of a customer application in a cloud environment. According to the characteristics of the cloud environment, the invocation of the application may cause its deployment on the cloud, e.g., its provisioning, installation and starting, together or preceded by the deployment of the necessary runtime platform. FIG. 1 illustrates customer application 'X' 180 deployed on cloud 150 together with application server 170 and service 'L' 175. For example, application server 170 may include a subset of the components of application server 110 that are necessary for executing application 'X' 180. Similarly, service 'L' 175 may be one of services 115 to 125 that is requested by the application 'X' 180.

To allow safe and dynamic installation, application 'X' 180, service 1' 175 and application server 170 are described or merged together in product 'X' 160, according to one embodiment. The definition of product 'X' 160 may be based on the characteristics and the requirements of the application 'X' 180. The packaging of application 'X' 180 together with the prerequisite runtime platform components, e.g., application server 170 and service 'L' 175, facilitates the installation of the application 'X' 180 on the cloud 150. For example, some of the elements of the installation including application 'X' 180, service 'L' 175 and application server 170 could be updated. Such a change may be dynamically validated for compatibility prior to the installation and without performing extra tests, simply based on metadata of the merged product 'X' 160. Thus, no resources are consumed for an installation that can eventually fail. In one embodiment, product 'X' 160 refers to runtime platform 105 including application server 170 and service 'L' 175 as a separate standalone base product. The base product, e.g., the runtime platform 105 may be installed on cloud 150 nested in the installation of the standalone product 'X' 160.

There are different technology solutions that may implement provisioning of applications to cloud environment together with a base product, e.g., the runtime platform. One example for such technology includes p2® provisioning platform for Eclipse®-based applications. Eclipse® is an open source community, whose projects are focused on building an open development platform composed of extensible frameworks, tools and runtimes for building, deploying and managing software across lifecycle. The p2® platform is part of the Equinox® project of Eclipse®.

Eclipse® development platform enables adding extensions that provide functionalities for the software development tools created and used among the community. Software developers, including commercial vendors, can build, brand, and package products using the technology of the Eclipse® platform as a base. These products can be sold and supported commercially. Therefore, the efficient provisioning of the developed products is especially important. Eclipse® provides software development kit (SDK) that can be downloaded and used as Java® integrated development environment. By adding various enhancement, the Eclipse® platform could be used to develop applications in various programming languages, such as, but not limited to, Java®, Perl®, C®, C++®, PHP®, etc.

An Eclipse®-based product is a stand-alone program, e.g., self-contained and installable software application, built using the Eclipse® development platform. A product may optionally be packaged and delivered as one or more of so called features. A feature may correspond to a particular functionality of the product or the application, and usually groups a number of unitary software components that could be managed together as a single entity. According to the terminology adopted in Eclipse® projects, such unitary software components are called plugins. The plugins are the basic installable and executable units or software code structures built by the Eclipse® developers.

By definition, products include all the code (e.g., plugins) needed to run the corresponding applications. For example, a product may include a newly developed Java® based application, a Java® Runtime Environment (JRE) and the Eclipse® platform code. The current Eclipse® provisioning platform p2® requires the plugins, the JRE, and the necessary Eclipse® platform code to be packaged and installed together as a single product. In one embodiment, instead of packaging the application components together with the runtime platform installation or with other base products necessary for the installation and execution of the application, only a reference to one or more such base products could be included in the product installable description.

Figure 2:
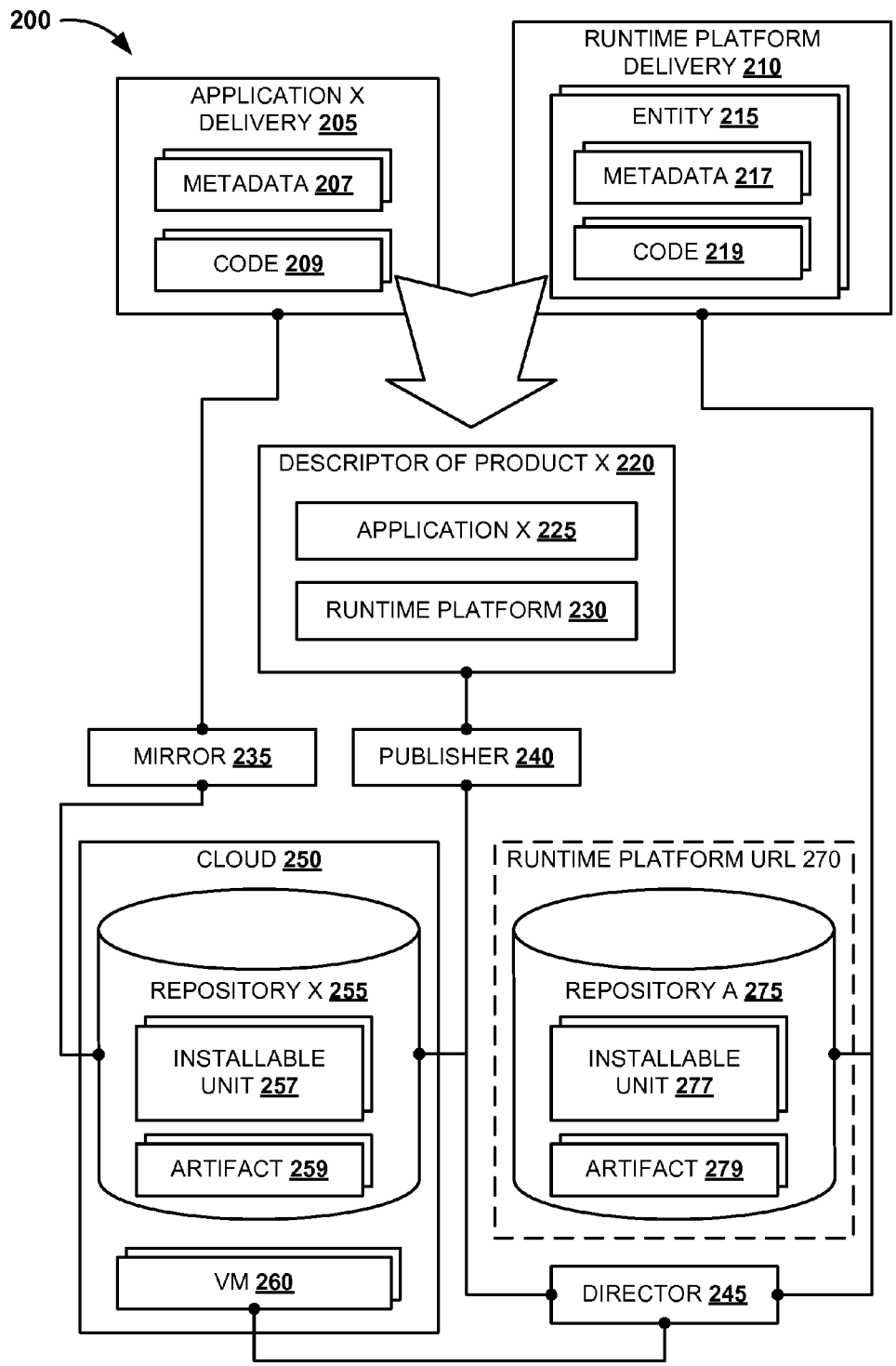
FIG. 2 is a block diagram illustrating a computer system landscape for provisioning customer applications to cloud, according to one embodiment.

In one embodiment, Eclipse® provisioning mechanism p2® may be utilized to generate, validate and install product 'X' 160 based on the definitions of application 'X' 180 provided by customer 145, and further based on the definitions of runtime platform 105. FIG. 2 shows computer system landscape 200 for provisioning customer applications (for example, application 'X') that include nested installations of base products, e.g., runtime platform. Such provisioning may be implemented in the context of the p2® provisioning platform of Eclipse®, according to one embodiment.

Delivery 205 of application 'X' developed and/or prepared by a customer of a cloud service may include one or more descriptions or metadata 207 of the component of application 'X'. Further, the application 'X' delivery 205 may include one or more software code modules 209 containing the programs or source code of the components of application 'X'. Similarly, the runtime platform delivery 210 created by the provider of the runtime platform includes metadata 217 and source code modules 219 of the different entities 215 of the runtime platform. In one embodiment, the application server or the different services pluggable in the runtime environment may be described as separate entities 215, e.g., separate subproducts. Alternatively, all the elements of the runtime platform 210 may be delivered as a single entity, e.g., as a standalone base software product.

In one embodiment, a descriptor 220 of product 'X' is generated to describe as a standalone software product the composition between application 'X' 225 and runtime platform 230, e.g., according to the requirements of the Eclipse® p2® provisioning platform. The descriptor 220 of product 'X' may be materialized in one or more "product" files including the references to application 'X' 225 and runtime platform 230, and the configuration and dependencies between application 'X' 225 and runtime platform 230.

Publisher 240 may use descriptor of product 'X' 220 to generate repository 'X' 255 containing deployable definition of the standalone product 'X' containing one or more installable units 257 and artifacts 259. According to the terminology adopted in Eclipse® projects, publisher are means by which deployable entities get added to install repositories. Publisher 240 may consist of an extensible set of publishing actions that allow users to generate p2® repositories from a number of different sources, e.g., the descriptor 220 of product 'X', the delivery 205 of application 'X', the delivery 210 of the runtime platform, etc.

In one embodiment, repository 'X' 255, is a composite p2® repository that stores metadata comprising one or more installable units 257 and pertinent artifacts 259 storing physical installable program code. The installable units 257 describe a number of functionalities, e.g., delivered by plugins grouped in features. The plugins may correspond to the source code modules of the product 'X'. The installable units describe the functionalities of the corresponding plugins and features, as well as the relationships and dependencies existing between them. Further, the installable units may provide configuration of the plugins and the features of the product 'X' necessary for its installation on the cloud. A root installable unit of installable units 257 may correspond to the product 'X'. In one embodiment, the composite repository 255 may be placed directly on cloud 250, or at a location accessible by cloud 250, where cloud 250 may refer to one or more connected computer systems providing the necessary environment for deploying product 'X'.

Repository 'X' 255 is a composite repository, because it stores installable information for the composite product 'X' that is blending together with the application 'X' and the runtime platform base product. In one embodiment, composite repository 'X' 255 may refer to separate repositories of the elements of product 'X'. For example, an install repository of the runtime platform base product, e.g., repository 'A' 275, may be published at runtime platform Uniform Resource Locator (URL) 270. The install repository 'A' 275 may be used for uploading the runtime platform on the cloud for different applications, not just for application 'X'. Similar to repository 'X' 255, repository 'A' 275 includes one or more installable units 277 and artifacts 279 providing an installation package for the base product (the runtime platform). In one embodiment, repository 'A' 275 may publish an installation package of the complete base product, including the complete set of the components of the runtime platform. The provider of the runtime platform can make changes to some of the components, and replace the affected installable units 277 and artifacts 279 independently from the definition of the installation of product 'X' in the composite repository 255.

The customer of the cloud service may deliver applications 'X' in the form of physical artifacts, e.g. binary files or archives which publisher 240 may publish in repository 'X' 255 in the context of the composite product 'X'. Alternatively, the customer can publish the application 'X' on an accessible location, e.g., update site, and provide the address of the location with the published application to the p2® provisioning mechanism. In one embodiment, mirror 235 is a module or technology used by the provisioning mechanism to copy the published installation of application 'X' locally, e.g., to cloud 250. In one embodiment, mirror 235 may create a copy of the published repository of the application 'X' that is referred by the composite repository 'X' 255.

The remote update site provided by the customer may include more artifacts that are actually needed for the proper functioning of the application 'X'. In one embodiment, mirror 235 may copy only artifacts that are necessary or required by application 'X'. Further, mirror 235 may copy only those artifacts of application 'X' that are necessary for the services requested from application 'X' from current consumer or consumers. Once deployed, application 'X' may access, and accordingly provide only the mirrored functionalities or features.

In one embodiment, director 245 represents the module or the tool of the implemented provisioning platform that actually installs the artifacts of product 'X', e.g., artifacts 259 and 279, based on the metadata, e.g., provided by the installable units 257 and 277. In one embodiment, director 245 may be an application performing some or all of the p2® operations of installing, uninstalling and updating installable units. Given the appropriate metadata, this application is capable of provisioning a complete installation or simply extending a previous installation of application 'X' on cloud 250. The installation of application 'X' on cloud 250 may require the generation of one or more virtual machines 260 where the application 'X' executes in the runtime platform to provide predefined services to one or more consumers. The tools provided by the p2® provisioning platform allow the installation of business applications in cloud environment as a single integrated process, without separately installing the base products or platforms.

In one embodiment, the metadata of the published composite product 'X' (installable units 257), including the metadata of application 'X' and the metadata of the runtime platform (installable units 277) are resolved before the actual installation of the product on the virtual machines 260 of cloud 250. The resolution is a process that may serve for at least two purposes. One is to identify for both, application 'X' and the runtime platform, the subset of necessary components from the set of published artifacts, based on the installable units (257 and 277) and the dependencies between them. The other purpose of the resolution of the metadata is to validate the compatibility between the delivered application 'X' and the required runtime platform, especially when one of the application 'X' or the runtime platform, or both, are separately changed or updated since the last deployment of the installable package published in the composite repository 'X' 255. Thus, application 'X' and the runtime platform base product are synchronized based on the dependencies and requirements described in the metadata to test the installation before being actually processed.

Figure 3:
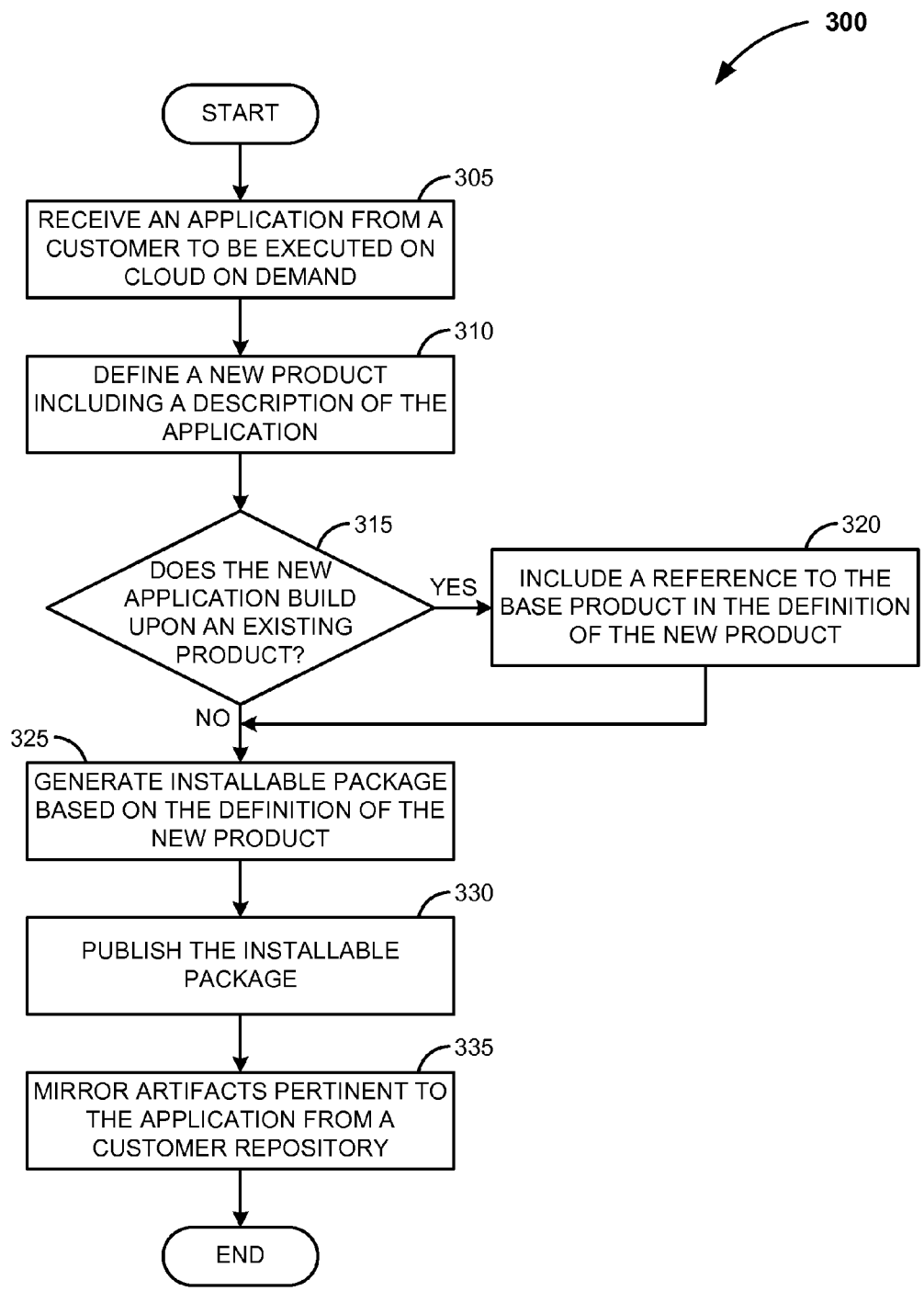
FIG. 3 is a flow diagram illustrating a process for generating and publishing composite product installations, according to one embodiment.

FIG. 3 shows process 300 for generating and publishing installations of products composing customer applications and base products, according to one embodiment. At 305, an application is received from a customer to be installed and run on demand in a cloud environment. At 310, a new product is defined including a description of the received application. The definition of the new product may provide an installation framework or shell configuring the installation of the application. In one embodiment, in order to avoid the possible risks associated with multi-step installation processes, new functionalities can be installed in the cloud environment as complete standalone products, not as extensions of existing, e.g., previously installed, products.

In one embodiment, the functionality provided by the delivered application adds to the functionality of an existing or base product (or products). For example, the functionality of the delivered application may depend on the availability of a compatible runtime environment. The runtime environment may be provided by an application server, e.g., Java® application server, and the customer application may provide various business related services to a number of consumers, e.g., clients of the customer of the cloud environment. At 315, a check is performed to verify whether the new application builds upon an existing product. If this is the case, a reference to this base product is included in the definition of the new product at 320. The reference is necessary to ensure that the new product that includes the new application can be installed as a standalone software product nesting the base product, without preliminary software installation steps.

At 325, an installable package is generated based on the definition of the new product. In one embodiment, the installable package is a combination of metadata and physical artifacts, e.g., source code binary files, ready for installation. The installable package is published at 330. In one embodiment, the application may be delivered as a combination of physical artifacts (for example, stored in one or more Java® archives or ".jar" files) and metadata describing and configuring the functionalities of the application components. The application artifacts and the metadata may be stored in a separate, e.g., customer, repository. At 335, the application is provisioned or mirrored from this repository onto the cloud, e.g. when the application has to be installed and started.

The runtime platform components, e.g., including infrastructure core runtime components and enterprise services components, may be kept isolated in another separate repository, used by the provisioning of all applications in the cloud relying on the same runtime environment. The publishing at 330 creates a composite repository of the new product that merges the descriptions of all the necessary components that has to be provisioned onto the cloud as a single entity. The components may include but are not limited to, core runtime components, enterprise services components, customer application components, defined dependencies between the components, etc. The new or composite product has metadata representation stored in the repository as a number of installable units, which may enlist the components required for provisioning to the cloud. In one embodiment, the composite product may have also a physical representation resulting from the installation on the cloud, which could be a self-contained software unit packing, configuring and distributing the included binaries (software code) in atomic manner.

Since the merged product serves to unite both the application and the infrastructure components (of the runtime platform), which are kept in different repositories, the product repository has a composite structure comprising two parts. One part includes the application artifacts and also describes the relationships and the dependencies between them. Another part includes an URI, pointing to the runtime platform repository, which in general is common for all customer applications depending on the same runtime environment.

Figure 4:
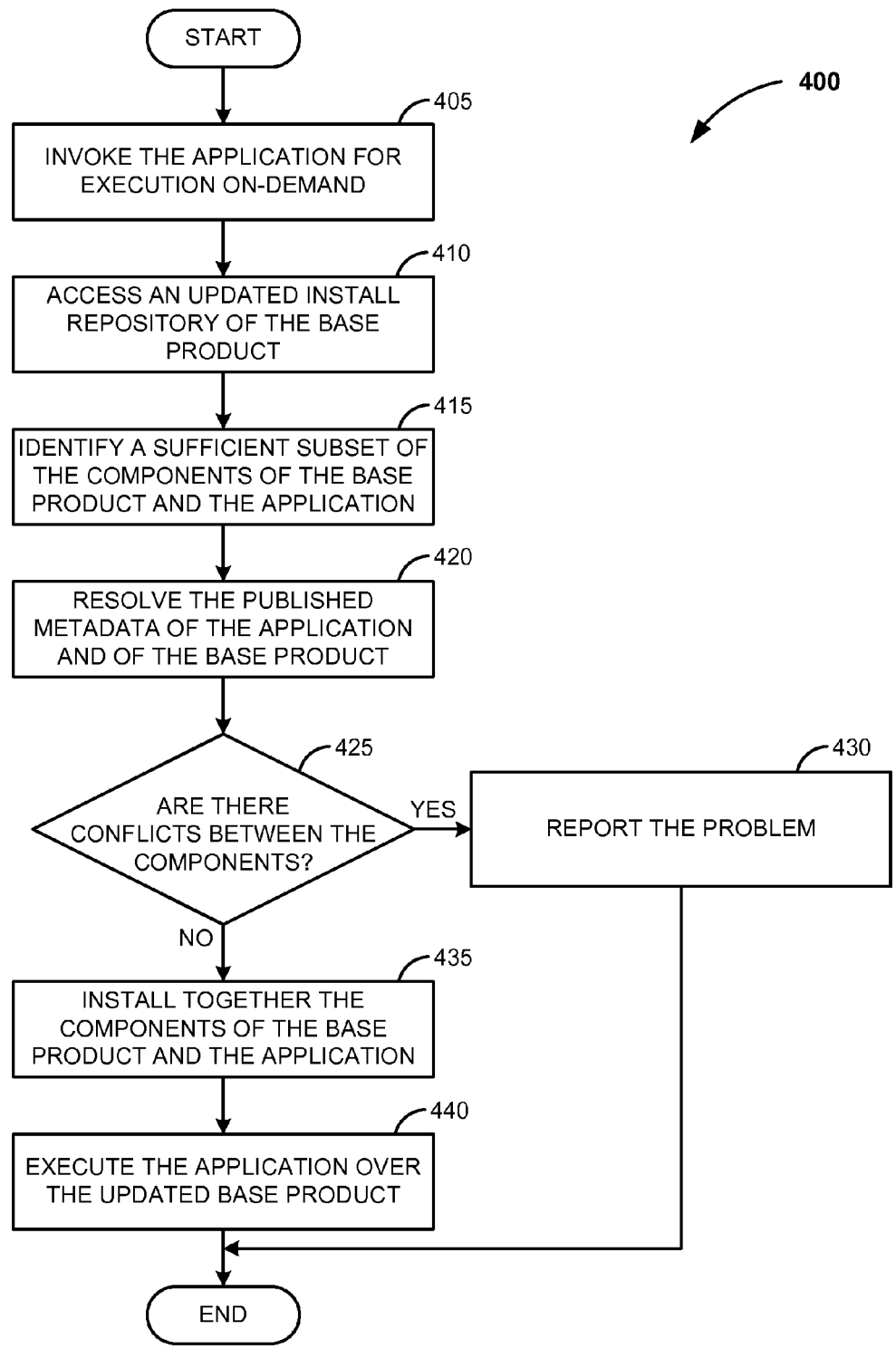
FIG. 4 is a flow diagram illustrating a process for dynamically updating base products for customer applications, according to one embodiment.

FIG. 4 shows process 400 for dynamically updating a base product, where the customer application relies on the base product. In one embodiment, process 400 starts at 405 with invoking the application for execution, e.g., execution on-demand. In other words, a consumer request for a service provided by the customer application may be received at a cloud environment. In one embodiment, the consumer application is built upon the base product. For example, the customer application may be executed in a runtime environment provided by a runtime platform (containing, e.g., application server, enterprise services, etc.).

The invocation of the customer application triggers an installation of a composite product including the customer application and the base product. The installation of the composite product may nest a synchronous or integrated installation of the required base product, e.g., runtime platform. The composite product may have an installation package generated and published in a composite repository, e.g., on a server of the cloud environment. The composite repository may refer to a repository where the installation artifacts and metadata of the customer application are mirrored from a customer update site, and to an install repository of the runtime platform.

At 410, an updated install repository of the base product is accessed for reading the metadata and the artifacts necessary for installation. In one embodiment, the same base product may serve a number of applications provided by different customers. For example, if a runtime environment is provided by a webserver, different web applications could be based on the same webserver. The separate installations of the dependent customer applications on the cloud generate different instances of the base product as well, e.g., installed in separate virtual machines. Accordingly, different composite products including different customer applications may still include a reference to the same installation repository of the base product.

Typically, the development of the base product is an ongoing process, as well as the development of virtually every software solution that is actively used. For example, new improved versions of the runtime platform are generated recurrently to replace the old versions. In one embodiment, the content of the install repository of the base product may be updated dynamically and independently from the updates of the customer application, e.g., to reflect the current version of the runtime platform.

At 415, sufficient subsets of the components of the application and the components of the base product are identified. For example, only the components of the runtime platform necessary for the execution of the invoked application are selected for installation, e.g., from the updated repository of the base product. In another example, only the components of the application and the runtime platform required for providing the service requested by a consumer are selected for installation. In one embodiment, the merged (composite) product is published only with the subsets of components, e.g., installable units and artifacts.

At 420, the published metadata of the application and the base product is resolved. The resolution of the metadata could mean various things, according to the embodiment. For example, the resolution mechanism of the provisioning process takes care to add only the identified required components of the application and/or the base product to the installation batch. The installation process could be greatly simplified since it includes just one step to provision a single unit, e.g., the composite product, which unites all of the necessary components. This approach provides significant advantage compared to installing each component or element of the composite product in a separate step, independent of each other and not able to predict at what point the process can fail.

The behavior of the merged product as an atomic unit allows testing the integration of all its components prior to the actual provisioning step. The resolution performed at 420 on the merged product can analyze and detect any unsatisfied dependencies between the different components, including the components of the updated base product. Such unsatisfied dependency can cause the installation of the application in the cloud to abort, even before the actual installation takes place.

At 425, a check is performed to verify whether there are conflicts between the components of the application and the base product. In particular, the check at 425 shows whether there is some incompatibility between the customer application and the updated runtime platform. If there is such a conflict, the problem is reported at 430 and process 400 ends. However, if there is no conflict identified during the resolution of the metadata of the composite product, the components of the application and the base product are installed together on the cloud at 435.

In one embodiment, a separate virtual machine is instantiated in the cloud environment. The runtime platform together with the customer application are synchronously installed and configured on the virtual machine based on the definitions of the metadata in the corresponding published repositories. After the successful installation of the components of the merged product, the customer application is executed over the updated base product at 440, and the requested business services can be provided to the one or more consumers.

In the description of processes 300 and 400 illustrated with FIG. 3 and FIG. 4, respectively, an assumption is made that the customer application and the base product are installed in cloud environment. However, a specialist in the art would recognize that same principles apply in defining and installing composite software products on other types of computer system environments, which may not involve cloud computing.

Figure 5:
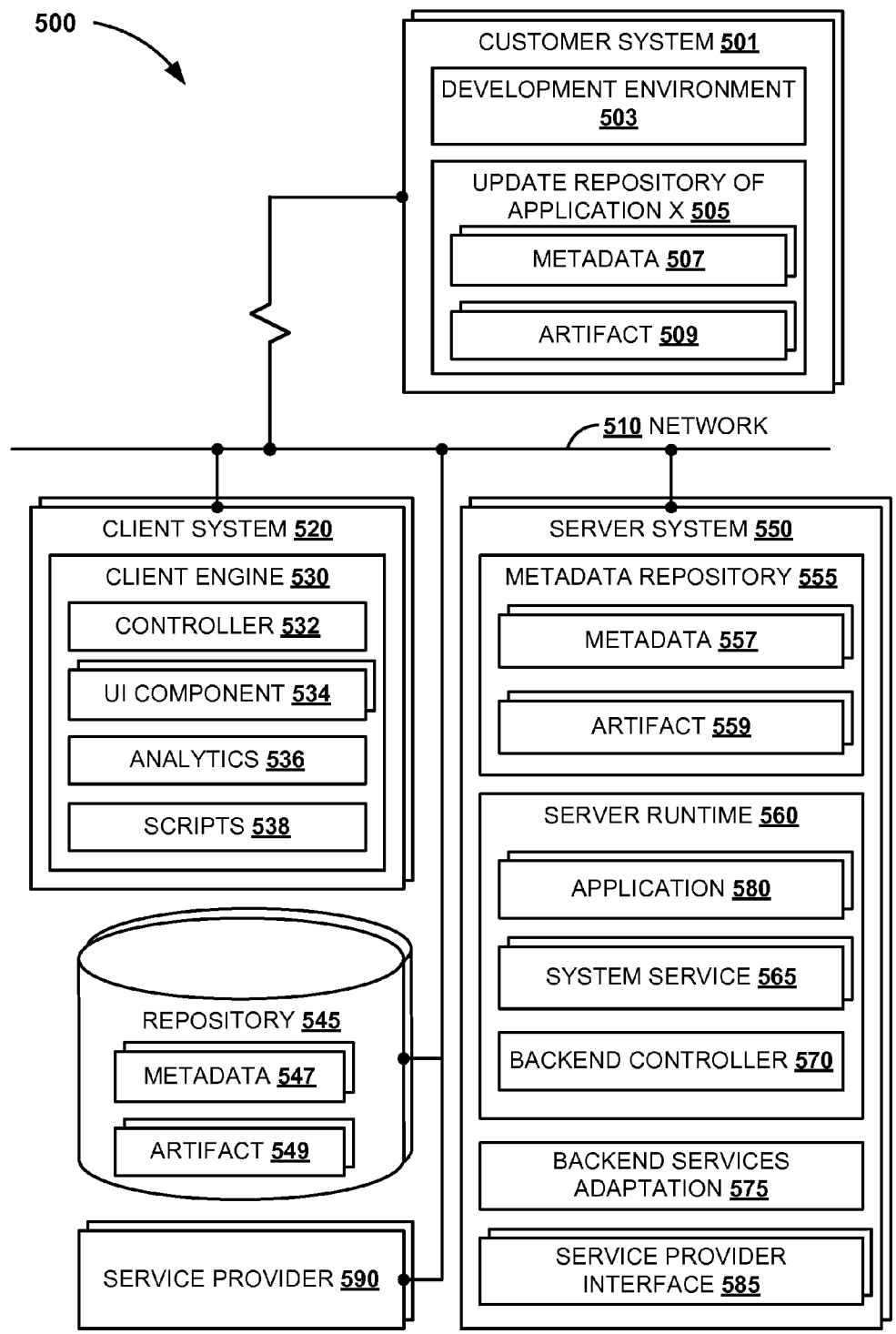
FIG. 5 is a block diagram illustrating a computer system landscape for dynamic updates of runtime platforms for business applications, according to one embodiment.

FIG. 5 is a block diagram showing computer system landscape 500 for dynamic updates of runtime platforms of business applications, according to one embodiment. The computer system landscape 500 includes a rather simplified example of classic client-server architecture. One or more shareholders or users, e.g., software product designers, developers, quality assurance (QA) specialists, end users, managers, etc., operate on one or more client systems 520 at a provider of cloud services. The users may request different services or execute various operations available within client systems 520, or provided by one or more server systems 550 via network 510. The illustrated server systems 550 represent one or more backend nodes in the computer system landscape 500. In one embodiment, server systems 550 may provide cloud services to one or more customers illustrated with customer systems 501.

The client systems 520 and the server system nodes 550, communicating via network 510, may define a number of different computer system environments. Some of the elements of the computer system landscape 500 resemble the structure and functionality of software modules developed by SAP AG. However, structures with similar functionalities could be found in software products developed by other vendors, as well. Alternative embodiments may utilize other kinds of computer system architectures.

The involved client systems 520 may have similar or different structures where one or more of the illustrated modules are replicated. In one embodiment, any of client systems 520 may execute a standalone client application, e.g., client engine 530, to interact with the backend server system 550. Alternatively, an intermediate layer may be downloaded to any of the client systems 520 as an extension of a running Internet browser. Such intermediate layer may be also illustrated as client engine 530. The standalone client application and the intermediate layer may have similar components and functionality. Client engine 530 takes responsibility for rendering the necessary client functionality, and also for communicating with server systems 550 via network 510 when necessary.

The client engine 530 may be a part of any popular browser integrated framework, e.g. Silverlight® provided by Microsoft Corp, Flex® provided by Adobe Systems Inc., JavaFX® originally developed by Sun Microsystems Inc., etc. In one embodiment, the client engine 530 may be desktop application, for example, a .NET® application rendering a User Interface (UI) through a Windows Presentation Foundation (WPF) system. In one embodiment the client engine 530 accesses the necessary business data at the backend 550 via network 510 with no dedicated UI server or client programs. The communication with the backend 550 may include extracting, storing and updating data. The data may be transported to repositories 545, especially when backend 550 implements a number of server nodes in separate computer system environments.

In one embodiment, users generate service requests at client engine 530 through UI components 534 that may instantiate one or more appropriate Graphical User Interface (GUI) screens or controls in response to the user request. The behavior of the UI components 534 is managed by controller 532 that makes sure that all instantiated controls in the UI components 534 are initialized. The controller 532 is also responsible for the execution of any configured operation triggered by events corresponding to the instantiated controls. In case when some of the operations involve execution of script segments, the controller 532 may trigger the execution of these scripts via scripts module 538. In one embodiment, scripts module 538 is a frontend scripting engine. Analytics module 536 may be used for frontend data processing when necessary.

In one embodiment, the backend 550 provides access for the modules 532 to 538 of the client engine 530 to underlying business functions and data structures. For example, the server runtime 560 may generate the UI object model underlying the instantiated UI components 534 at the client systems 520. The server runtime 560 provides environment where one or more software applications 580 are executed. For example, the applications 580 may provide a number of business services for the users of client systems 520 or for the customers at customer systems 501. Corresponding service requests are translated to relevant process tasks performed by the applications 580 executed in server runtime 560.

In one embodiment, the server runtime 560 may include backend controller 570 for one or more sessions of the client engine 530 to handle the instantiated UI components 534, e.g., when a session of the client engine 530 triggers an initialization of a UI component 534 for the first time. The backend controller 570 may manage the collaboration between the requested UI components 534 and one or more underlying business objects. System services 565 in the server runtime 560 may be used to administer the characteristics of the server runtime 560, e.g., its engine parameters, the user access to one or more components, the processes execution, the communication with other runtime environments, like, external systems, databases, etc. In one embodiment, system services 565 may also provide deployment, setup and change management of software components.

Metadata repository 555 is generally the place where metadata about the computer programs deployed in the server system 550 are preserved, according to one embodiment. There are different kinds of metadata that could be maintained by the metadata repository 555. For example, the metadata repository 555 may keep the description of business objects underlying the applications 580. In one embodiment, metadata repository 555 keeps in metadata 557 descriptions of the available installable units and the relationships between them as designed corresponding to one or more of the applications 580 executed in the server runtime 560. Further, the metadata repository 555 may include artifacts 559 pertinent to the installation of applications 580.

Metadata repository 555 may manage the collaboration with the server runtime 560 on one hand, and on the other hand, with various service providers 590. The service providers 590 may render various services to the backend 550 as defined in the metadata 557. The service providers 590 are available via service provider interfaces 585, and can be either internal or external to the backend 550. In one embodiment, backend services adaptation 575 represents a layer that helps to adjust designed UI or rendered UI components to a set of normalized business objects available at the server system 550.

In a multi-server system environment, e.g., in a cluster of more than one server system nodes 550, repository 545 may be used to store different kinds of common data, including programming code, business data, metadata, etc. In one embodiment, one or more different repositories 545 may be assigned to different computer system environments defined in the computer system landscape 500.

In one embodiment, users of the client systems 520 may design, create or change a program component, a data object or some other type of computer system artifact by manipulating UI components 534 associated with particular application or software tool. The UI components 534 may be available within GUI environment of the client engine 530. The manipulations of the UI components 534 may trigger execution of various system or application procedures in server runtime 550. Further, the manipulations of the UI components 534 may lead to changes in the metadata repository 555, e.g., changes in the definitions of the applications 580, or even changes to the server runtime 560 platform. Besides changing the business applications 580, the users of client systems 520 may use the tools provided by client engine 530 to make changes to base products deployable on server system 550, such as the server runtime 560.

In one embodiment, repository 545 may publish metadata corresponding to the installation definition of one or more base products of server system 550. For example, the server runtime 560 may be provided by a number of Java® application server core components. The current deployable version of the Java® application server components may be published at repository 545, including the corresponding metadata 547 (e.g., installable units) and the pertinent physical artifacts 549. Thus, the current complete installable version of the server runtime 560 may be available to server system 550 at the repository 545 for deployment whenever required for execution of the applications 580.

In one embodiment, one or more of the applications 580 executable at server system 550 are developed and/or delivered by customers of, e.g., through customer systems 501. The users of the customer systems 501 may use development environment 503 to develop new applications for execution in the server runtime 560 at server system 550. Thus, the customers may provide services to their clients through the infrastructure of another entity, e.g., the provider of server system 550. In one embodiment, the applications developed at customer systems 501 may be published in provisioning repository, e.g. in the update repository of application 'X' 505 storing the respective installable source code artifacts 509 and metadata 507 describing the application components. In one embodiment, the update repository of application 'X' 505 may be mirrored or replicated to metadata repository 555, or to repository 545, from where application 'X' could be installed directly on server system 550, for example, as a composite product including a nested installation of a base product, e.g., server runtime 560 and the application 'X' (e.g., one or more of applications 580).

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 6:
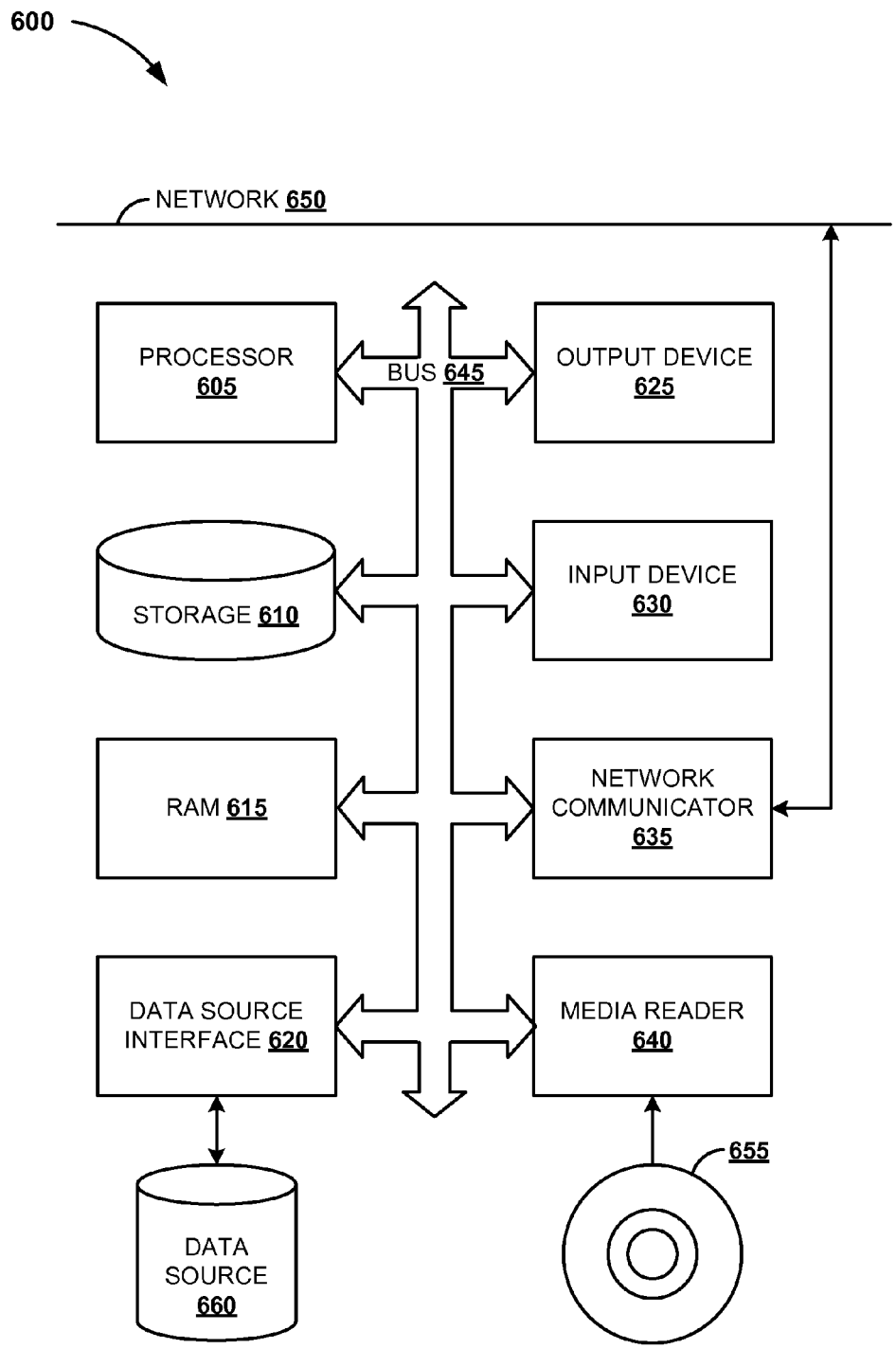
FIG. 6 is a block diagram of an exemplary computer system to execute computer readable instructions for dynamic update of base products for customer applications, according to one embodiment.

FIG. 6 is a block diagram of an exemplary computer system 600. The computer system 600 includes a processor 605 that executes software instructions or code stored on a computer readable storage medium 655 to perform the above-illustrated methods. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. The stored instructions may be further compiled to generate other representations of the instructions and dynamically stored in the RAM 615. The processor 605 reads instructions from the RAM 615 and performs actions as instructed. According to one embodiment, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed via network 650. In some embodiments the data source 660 may be accessed by an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the presented embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limiting to the precise forms disclosed. While specific embodiments and examples are described herein for illustrative purposes, various equivalent modifications are possible, as those skilled in the relevant art will recognize. These modifications can be made in light of the above detailed description. Rather, the scope of the specification is to be determined by the following claims, which are to be interpreted in accordance with established doctrines of claim construction.

What is claimed is:

1. A system to dynamically update on-demand runtime platforms for business applications, the system comprising:
   a memory to store computer executable instructions; and
   a processor coupled to the memory and operable to execute the instructions to generate:
      a software product composed by a business application and a runtime environment,
      an installable package of the software product, wherein the installable package of the software product includes a metadata of the business application and a reference to an installable package of a first version of the runtime platform, and
      an on-demand integrated installation of the business application and a second version of the runtime platform based on the installable package of the software product.

2. The system of claim 1, wherein the processor coupled to the memory and operable to execute comprises further instructions to:
   dynamically resolve the metadata of the business application against a metadata received from the installable package of the first version of the runtime platform to validate compatibility between the business application and the runtime platform, wherein the metadata received from the installable package of the first version of the runtime platform is updated to reflect the second version of the runtime platform.

3. The system of claim 1, wherein the installable package of the software product comprises:
   at least one installable artifact of the business application mirrored from an update location.

4. The system of claim 1, wherein the on-demand integrated installation of the business application comprises:
   a subset of a plurality of components of the runtime platform, wherein the subset of the plurality of components of the runtime platform is identified based on the metadata of the business application as sufficient for execution.

5. A non-transitory computer-readable medium storing instructions, which when executed cause a computer system to:
   receive an application for execution in a cloud environment, wherein the application includes metadata describing the functionality of the application;
   identify a runtime platform for executing the application based on the functionality of the application;
   define a product composing the application and the runtime platform;
   generate an installable package of the product including the metadata of the application and referring to an installable package of a first version of the runtime platform; and
   synchronously install in the cloud environment the application and a second version of the runtime platform based on the generated installable package of the product.

6. The non-transitory computer-readable medium of claim 5, wherein generating the installable package of the product comprises:
   publishing the installable package of the product in a composite repository of a provisioning platform.

7. The non-transitory computer-readable medium of claim 5, wherein generating the installable package of the product comprises:
   mirroring an installable package of the application from a customer location to a repository of a provisioning platform, wherein the installable package of the application includes at least one installable artifact.

8. The non-transitory computer-readable medium of claim 5, wherein generating the installable package of the product comprises:
   resolving the metadata of the application against a metadata received from the installable package of the first version of the runtime platform to validate compatibility between the application and the runtime platform.

9. The non-transitory computer-readable medium of claim 5, wherein generating the installable package of the product comprises:
   updating a content of the installable package of the first version of runtime platform to reflect the second version of the runtime platform.

10. The non-transitory computer-readable medium of claim 5, wherein synchronously installing the application and a second version of the runtime platform comprises:
   identifying a subset of a plurality of components of the runtime platform based on the metadata of the application, wherein the subset of the plurality of components of the runtime platform is sufficient for executing the application in the cloud environment.

11. The non-transitory computer-readable medium of claim 5, wherein synchronously installing the application and a second version of the runtime platform comprises:
  dynamically resolving the metadata of the application against a metadata received from the installable package of the first version of the runtime platform to validate compatibility between the application and the runtime platform, wherein the metadata received from the installable package of the first version of the runtime platform is updated to reflect the second version of the runtime platform.

12. The non-transitory computer-readable medium of claim 5, wherein synchronously installing the application and a second version of the runtime platform comprises:
  instantiating a virtual machine in the cloud environment to provide independent system platform for the product.

13. A computer implemented method to dynamically update base software products for a customer application, the method comprising:
  receiving a customer application for execution at a computer system;
  identifying a base software product required for executing the customer application based on at least one property of the customer application;
  generating by a processor of the computer system an installable package of a new software product, wherein the installable package of the new software product includes a metadata of the customer application and a reference to an installable package of a first version of the base software product; and
  uploading in a memory of the computer system the new software product based on the generated installable package of the new software product, wherein the new software product includes the customer application and a second version of the base software product.

14. The method of claim 13, wherein receiving the customer application comprises:
  mirroring the metadata of the customer application from a customer location, wherein the metadata of the customer application includes a description of at least one component of the customer application from.

15. The method of claim 14 further comprising:
  identifying the at least one component of the customer application based on a service request received from a customer.

16. The method of claim 13, wherein generating the installable package of the new software product comprises:
  resolving the metadata of the customer application against a metadata received from the installable package of the first version of the base software product to validate compatibility between the customer application and the base software product.

17. The method of claim 13, wherein generating the installable package of the new software product comprises:
  updating a content of the installable package of the first version of the base software product based on the second version of the base software product.

18. The method of claim 13, wherein uploading the new software product comprises:
  identifying a subset of a plurality of components of the base software product based on the metadata of the customer application, wherein the subset of the plurality of components of the base software product is sufficient for executing of the customer application.

19. The method of claim 13, wherein uploading the new software product comprises:
  dynamically resolving the metadata of the customer application against a metadata received from the installable package of the first version of the base software product to validate compatibility between the customer application and the base software product, wherein the metadata received from the installable package of the first version of the base software product is updated based on the second version of the base software product.

20. The method of claim 13, wherein uploading the new software product comprises:
  instantiating a virtual machine in the memory of the computer system to provide independent system environment for the new software product; and
synchronously installing the second version of the base software product and the customer application to provide at least one on-demand service to at least one consumers.

* * * * *